Patented Jan. 6, 1942

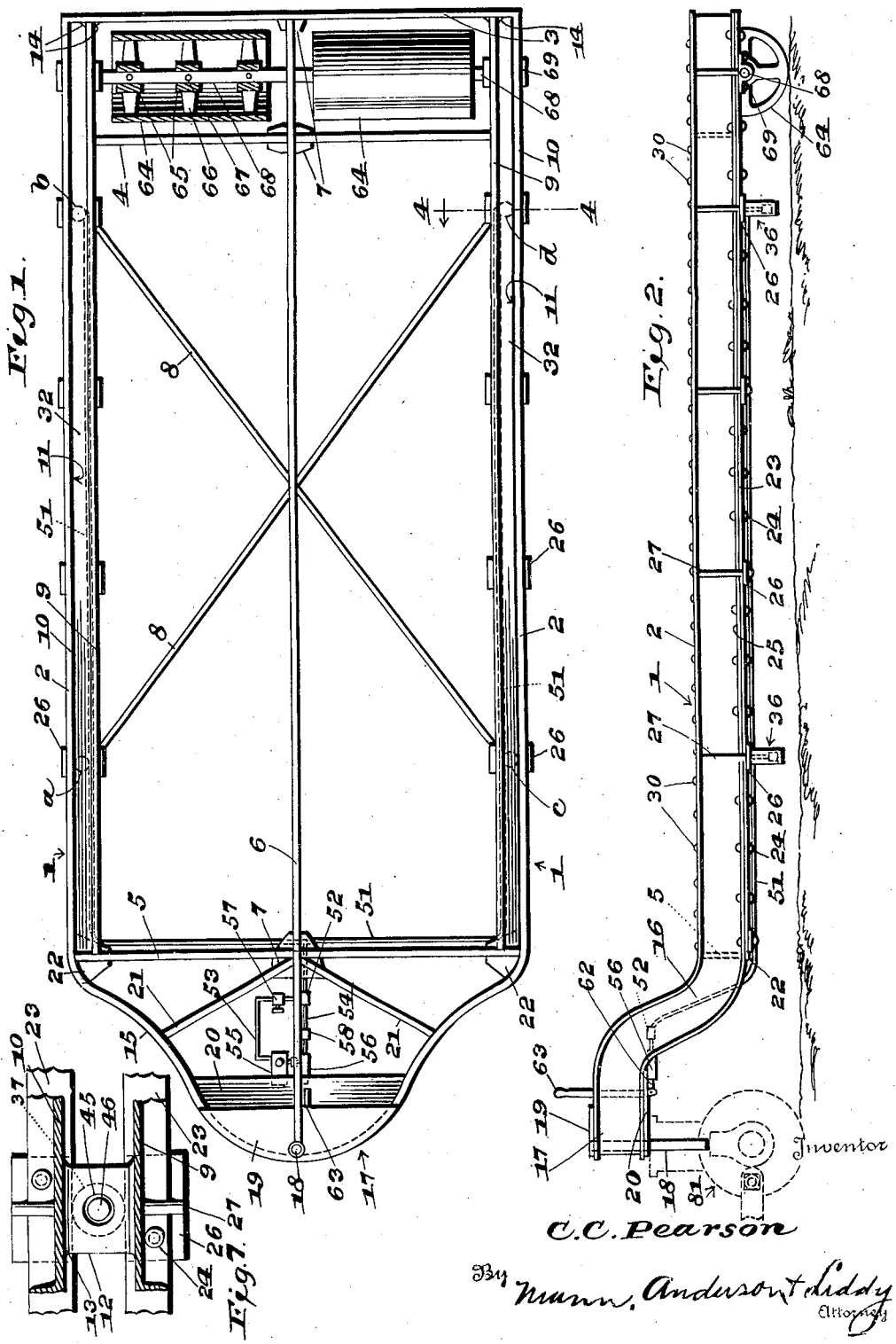

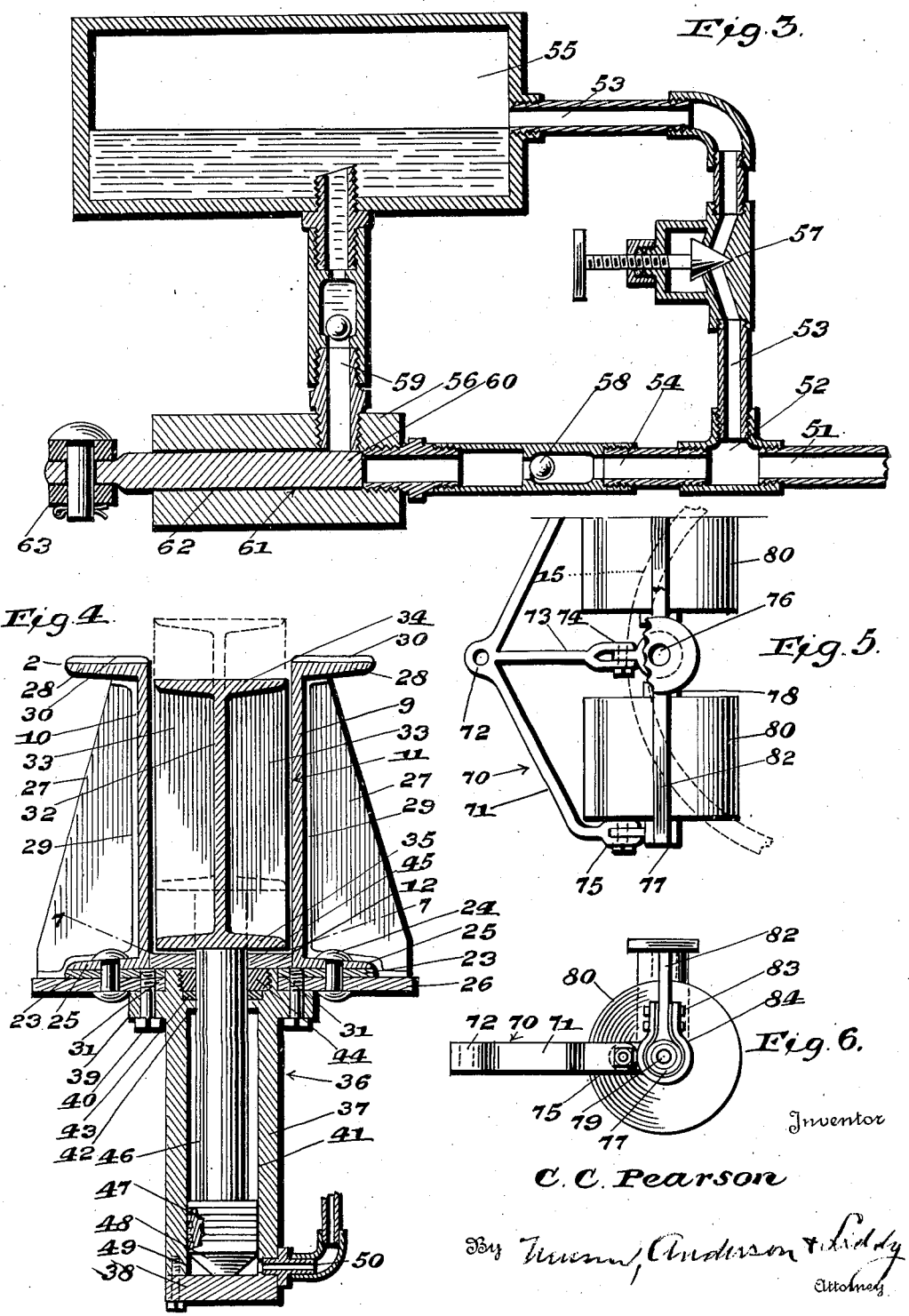

2,269,062

UNITED STATES PATENT OFFICE 2,269,062

LUMBER TRAILER

Charlie C. Pearson, Selma, Ala.

Application April 19, 1940, Serial No. 330,602

8 Claims. (Cl. 254—2)

This invention relates to improvements in pushing and pulling implements which, according to the present disclosure is especially adapted for use in conjunction with hauling lumber. This use, however, is not to be regarded as a limitation because the invention can be employed under any circumstance wherein a ponderous load is to be lifted at one locality, transferred to another and again let down.

But adhering to the chosen example, it is desired to explain that in manufacturing boards in a saw mill the practice is to pile or stack the lumber to a fairly high elevation with spacers between the boards to provide a slight pitch for drying and air spaces for the carrying off of the moisture. These stacks of lumber are piled on stacking blocks which support the mass of lumber at a predetermined elevation from the ground.

This provision is made in order to enable backing the instant trailer under the stack of lumber preparatory to raising the latter from the stacking blocks by means of mechanism embodied in the trailer. After said stacking blocks are removed the pile of lumber is lowered directly onto the frame of the trailer whereupon the load of dried lumber is transported to a new location in the lumber-yard where it is again superimposed upon other and previously emplaced stacking blocks. With these statements in mind the objects of the invention are as follows:

First, to provide a lift trailer which provides for the relatively easy transportation of heavy piles of lumber from one locality to another.

Second, to provide a lift trailer which is adapted to be used either in conjunction with a tractor or with an automobile truck, said trailer including a king pin which in the respective instance is emplaced in the socket of a trailer hitch or in any suitably provided socket in the truck, thus to obtain a hold upon the trailer for its transportation from place to place.

Third, to provide the trailer with a novel form of pressure fluid-actuated elevator, the mechanical requirements of which, such as piping, pump and auxiliary mechanism, are reduced to such a small degree as to keep the cost of this portion of the invention down to a relatively small amount without sacrificing the working efficiency of the device in the least.

Other objects and advantages will appear in the following specification, reference being had to the accompanying drawings in which, Figure 1 is a plan view of the improved lumber trailer, one of the rollers being shown in section.

Figure 2 is a side elevation.

Figure 3 is a horizontal section of a part of the pressure fluid mechanism by which the elevator is actuated.

Figure 4 is a cross section taken on the line 4—4 of Figure 1, illustrating one of the elevator jacks.

Figure 5 is a detail fractional plan view of the trailer hitch.

Figure 6 is a side elevation of the structure in Figure 5.

Figure 7 is a detail horizontal section taken on the line 7—7 of Figure 4.

The invention comprises the lifting trailer generally designated 1. This trailer embodies side frames 2 which are held in parallel relationship by a pair of heavy cross beams 3, 4 of any desired cross section as well as a single cross beam 5 also of any desired cross section. The trailer has a heavy beam or rib 6 situated on its longitudinal center, the points where this rib crosses the beams 3, 4 and 5 being marked by gusset plates 7 which are preferably welded on solely for the purpose of reinforcing the joints. The heavy work which the trailer is required to do makes it necessary to provide the heavy foundation suggested, the latter being still further reinforced by diagonal braces 8 which usually comprise channel irons but may consist of other cross sectional material.

Attention is momentarily directed to Figure 4 which illustrates the details of one of the side frames 2. Both of these are identical. Said side frame consists of an inner and outer channel beam 9, 10 which are laterally spaced at 11 by a number of spacer plates 12, one of which is shown in detail in Figure 7. Each spacer plate is welded at 13 to the contiguous beams 9, 10 so as to make a unitary structure. The erect relationship of the beams 9 and 10 to the plates 12 and to each other is maintained largely by the cross beams 3, 5 (Fig. 1) from which it is seen that said beams extend to the outer channel beams 10 and have the remote ends of the inner channel beams 9 welded thereto as at 14.

While considering Figure 1 note is made of the connection of the outer channel beams 10 with a looped front 15 which may or may not comprise an actual continuation of the outer channel beams. This looped front obviously must be especially formed to take the shape in Figure 1, and in doing the forming said loop is given a decided lift at 16 (Fig. 2), with a terminal head 17 from which a king pin 18 is made rigidly pendent. The top portion of the head 17 is bridged by a top plate 19 while the nether portion of said head is bridged by a bottom plate 20. It is to these plates that the king pin is rigidly affixed, the affixation being accomplished by welding or any other chosen mode. Diverging braces 21 aid in making the loop 15 rigid, the places where said loop curves off from the outer channel beams 10 being marked by gusset plates 22 which are welded in place wherever possible to fortify the joints.

Reverting to Figure 4, it is seen that immediately beneath the spacer plates 12 there are sub-plates 23 which are riveted at 24 to the bottom flanges 25 of the beams 9, 10 in common with anchor plates 26. The sub-plates 23 are full length of the body portion of the trailer (Fig. 2), that is to say, they stop substantially at the place where the upward curvature of the lift 16 begins.

On the other hand, the anchor plates 26 are quite short, occurring only at points where lateral stiffeners 27 are attached. These stiffeners are fitted against the webs of the beams 9, 10 (Fig. 4) and inside of the flanges 25, 28 thereof, from the former of which said stiffeners extend out a little to match projecting parts of the anchor plates, all to the purpose of producing a very strong construction. The stiffeners 27 are welded to the beams 9, 10 to portions of the sub-plates 23 and to portions of the anchor plates 26 at all points of marginal contact as suggested at 29. While doing the welding the top faces of the flanges 28 are beaded at 30 with streaks of the welding material. These streaks or beads are located perhaps four inches on centers, although this measurement is not necessarily adhered to, for the purpose of roughening the top surface of each frame 2 and thus insure against the slipping of the lumber pile.

It is observed in Figure 4 that the sub-plates 23 and anchor plates 26 project into the space 11 for slight distances at 31. These projections afford rests for the spacer plates 12, but what is more important they fortify said spacer plates against sagging in the event that the respective elevator beam 32 is chosen to be let down instead of supported by the piston rod. Such a beam occupies the space 11 of each of the side beams 2. It is perfectly loose in said space, but inasmuch as the latter has end closures formed by the projecting parts of the cross beams 3, 5 (Fig. 1), it becomes quite apparent that the space 11 is more in the nature of a pocket in which the elevator beam 32 is adapted to be moved up and down.

Each beam 32 desirably comprises an I-beam. The web spaces of this beam is bridged by stiffeners 33 at intervals, the outer edges of these stiffeners desirably coming flush with the margins of the top and bottom flanges 34, 35 of the elevator beam for the incidental and quite important purpose of furnishing something that will ride against the beams 9, 10 and prevent an inadvertent hanging of the top flanges 34 upon the top flanges 28 of said beams 9, 10, it being noted in Figure 4 that when the elevator beam 2 is let down it goes well into the pocket 11 so as to entirely clear the superimposed load of lumber.

Thus, although the elevator beams 32 lay loose in the pockets 11 there is no chance of their getting out of position. Said beams are actuated simultaneously by jacks which are made to operate at four points a, b, c and d (Fig. 1). The construction of each of these jacks is alike and is shown in detail in Figure 4. Here the jack 36 consists of a cylinder 37 which is structurally open at both ends. The flanged top portion 39 is bolted at 40 to plates 23, 26 from which the jack extends in a rigidly pendent position. The bore 41 of the cylinder has an internal flange 42 which provides a rest for a lead packing 43. This packing is compressed by a nut 44 which is screwed into a threaded counterbore in the upper end of the cylinder. This nut is held permanently in position by the spacer plate 12 which extends over the end of the cylinder, it being noted that said end constitutes a projection beyond the flange 39, and since it is substantially as long as the plates 23, 26 are thick it follows that screwing of the bolts 40 home will drive the upper end of the cylinder hard against the plate 12 and incidentally also lock the nut 44 against said plate.

The latter has a hole 45 (Fig. 7) which provides a working outlet for the rod 46 of a piston 47 in the bore 41. Said piston is desirably bevelled at 48 so as to define an annular fluid chamber 49. The piston 47 is adapted to be let down upon the closure plate 38 but the bevel 48 provides for ready access of pressure fluid from the connection 50 of the line 51.

This line (Fig. 1) serves all of the jacks, its origin being traced to a T 52 (Fig. 3) which is joined by piping 53, 54 respectively to a fluid tank 55 and a pump cylinder 56. The piping 53 has a ball check valve 58. A valved connection 59 joins a laterally located inlet 60 of the pump cylinder 56 with the tank 55. Said inlet has communication with the pump bore 61 to one end of which the piping 54 is connected as shown.

An appropriately made plunger 62 is operable in the bore 61 by a lever 63 which extends off to a place of convenient access as denoted in Figure 2. Repeated strokes of the plunger 62 will drive the fluid into the line 51, the needle valve 57 being closed at this time. The result is an elevation of the elevator beams 32. A subsequent opening of the needle valve allows a return of the pressure fluid to the tank.

At least one pair of rollers 64 (Figs. 1 and 2) comprises a part of the permanent equipment of the trailer 1. Each of these rollers comprises a malleable steel casting with a chilled rim, said casting including hubs 65 and spokes 66. The hubs are pinned at 67 to a shaft 68 which is common to both rollers. The outer ends of this shaft are journalled in appropriate bearings 69 (Fig. 2), preferably roller bearings, said bearings in all instances being emplaced on the undersides of the side frames 2 so as to properly take the load.

The king pin 18 (Fig. 2) may either be emplaced upon an automobile truck (not shown) for the transportation of the trailer 1 from place to place, or said king pin may be used in conjunction with a hitch 70 (Figs. 5 and 6). Said hitch is in the nature of a wheeled dolly, and in most instances it will desirably be used because it is particularly adapted for connection to a small tractor such as is often found around saw mills and lumber-yards.

For the latter purpose said hitch has a bale 71 which converges to a central eye 72 at which the tractor connection is made. Said eye has a reach bar 73 which has a forked terminal 74 matching the forked terminals 75 of the bale 71. These terminals respectively are connected with a king pin socket 76 and roller bearings 77. Said roller bearings are the outer ones of pairs 77, 78 of said bearings which support the shafts 79 of rollers 80.

The socket 76 is obviously for the purpose of turnably receiving the king pin 18, the relationship of the hitch 70 to the trailer 1 readily being aided by the dotted line showing at 81 in Figure 2. The socket 76 is supplemented by side I-beam frames 82. These frames stand upright, and they provide the places of attachment at 83 (Fig. 6) of holders 84 by which the outermost ball bearings 78 are contained.

The operation is readily understood. The elevator beams 32 are initially in the down position (full lines, Fig. 4). Said elevator beams are shown as resting on the top extremities of the piston rods 46, but it is also possible to shorten the piston rods so as to rest the elevator beams directly on the spacer plates 12. The latter are sufficiently reinforced to take the load of the elevator beams.

Upon having maneuvered the trailer 1 under a stack of lumber pressure fluid is introduced into the pressure line 51 by working the pump 56. The elevation of the beams 32 (dotted lines, Fig. 4) raises the stack of lumber. Upon removing the stacking blocks and opening the initially closed needle valve 57 the stack is let down upon the side frames 2 preparatory to hauling to some point of disposal. Here the foregoing processes are partly repeated and reversed for the emplacement of the stack in the new location.

In conclusion it is desired to explain that the level showing of the trailer 1 in Fig. 2 in reference to the ground, is mainly due to a matter of convenience in drawing. If the back end is 12 inches from the ground the front end will be at least 24 inches from the ground. When using an automobile truck it is obviously not necessary to use the front rollers on the trailer hitch. The front rollers on the trailer hitch will be used when the latter is pulled by a tractor.

I claim:

1. A trailer comprising a wheeled body, frames in said body including channel beams located back to back, spacer plates fixedly connected to and between said beams defining pockets, elevator members contained by said pockets, and jacks to actuate the elevator members, said jacks including cylinders affixed to the frames and pistons operable in the cylinders having rods guided by the spacer plates, being movable therethrough and projecting into the pockets against the elevator members to raise and lower the elevator members.

2. A trailer comprising a wheeled body, frames included in said body consisting of longitudinally disposed parallel channel beams having their upright webs contiguously placed and spaced laterally of each other to define pockets, elevator members contained by the pockets consisting of I-beams, lateral stiffeners affixed to the webs and flanges of the I-beams, the outer edges thereof being marginally flush with the flanges to make contact with the webs of the frame beams and prevent inadverent catching of the I-beam flanges on said frame beams, and pressure fluid-operated jacks to raise and lower the elevator members, said jacks consisting of cylinders affixed to the frames and having pistons with rods contactable with the nether sides of the elevator members.

3. A trailer comprising a wheeled body, said body including longitudinally disposed frames, each consisting of laterally spaced channel beams with the flanges of the channels contiguous to each other, a system of cross beams spacing the side frames apart, some of said cross beams spanning the distance between the channel beams and completing the formation of pockets, spacer plates between the beams of said frames, partially bottoming said pockets and having holes, elevator members contained by said pockets, consisting of I-beams and stiffeners affixed to the webs and flanges thereof with their outer edges in flush relationship to the margins of the flanges to act as guides against the webs of the frame channels, and pressure fluid-operated jacks to raise and lower the elevator members, said jacks including cylinders affixed to the frames and having pistons operable therein with rods working in said spacer holes to make contact with the elevator members.

4. A trailer comprising a wheeled body, side frames included in said body, consisting of longitudinally disposed pairs of channel beams having their webs placed continguously to each other, spacer plates affixed to said beams to maintain the spacing of said webs, a system of cross beams spacing the side frames, some of the cross beams bridging the distance between the frame channels to complete the formation of pockets, a longitudinal central rib affixed to the cross beams and extending beyond one end cross beam, a looped front in virtual continuation of the outermost ones of the channel beams, embracing the contiguous terminal of the mid rib, a king pin anchored substantially at said terminal whereby to accomplish the transportation of the trailer, elevator members loosely set in said pockets, and pressure fluid-operated jacks to raise and lower the elevator members, said cylinders having pistons with rods working up through the spaces of the side frames and entering the pockets to make contact with the elevator members.

5. A trailer comprising the combination of a body having ground rollers at one extremity and a king pin at the other extremity, side frames included in said body consisting of laterally spaced beams defining pockets, a pair of cross beams affixed to the side frames contiguously to the rollers, the ends of one of said cross beams spanning the distance between the frame beams to maintain their spacing, a cross beam adjacent to the other extremity of the body also spanning the distance between the frame beams to maintain said spacing, an elevator loosely contained by each pocket, a system of jacks on the nether side of the side frames, being pendent therefrom in the direction of the ground and having rods operable against the elevator to raise and lower them, and a hitch for the transportation of the trailer, including ground rollers and a socket for the reception of the king pin, the connection of the king pin with the socket supporting the side frames above the ground to prevent the jack cylinders from scraping the ground surface.

6. A trailer comprising the combination of an open frame body, said body including longitudinally disposed side frames having longitudinal pockets therein extending virtually full length of the body, ground rollers at one end of the body, a king pin pendent from the other end of the body, elevator beams loosely occupying the pockets, jacks to operate said beams including cylinders affixed to the under sides of the side frame and pendent therefrom in the direction of the ground, said cylinders having pistons with rods extending into the pockets being adapted to support and actuate the elevator beams, mechanism mounted on the body constituting the source of pressure fluid for the jacks, and a hitch for supporting the body level with the ground, including rollers riding the ground and a socket in which the king pin is set, said support of the body keeping the jacks clear of the ground and preventing their scraping the ground surface during the transportation of the body.

7. In a trailer, a side frame including a pair of channel beams, the webs of said beams being placed contiguously to each other to define a pocket, the top and bottom flanges of said beams extending outwardly, an elevator beam contained by the pocket and being operable past the top flanges to raise and lower the lumber superimposed thereupon, and a roughening on the top surfaces of said top flanges consisting of welded beads spaced from each other in the longitudinal direction of the channel beams.

8. A wheeled body, at least one frame in said body including channel beams located back to back, at least one spacer plate fixedly connected to and between said beams defining a pocket, an I-beam situated in said pocket and constituting an elevator member, a jack to actuate said member, said jack including a cylinder depending from the frame and having a rod guided by and working up through the spacer plate to move the I-beam out of the pocket, and stiffeners fixed in the web spaces of the I-beam, said stiffeners having their outer edges flush with the margins of the top and bottom flanges of the I-beam to ride against the channels.

CHARLIE C. PEARSON.